Oct. 18, 1932. F. W. ZINK 1,883,287
REAR VIEW MIRROR ASSEMBLY
Filed Nov. 11, 1929
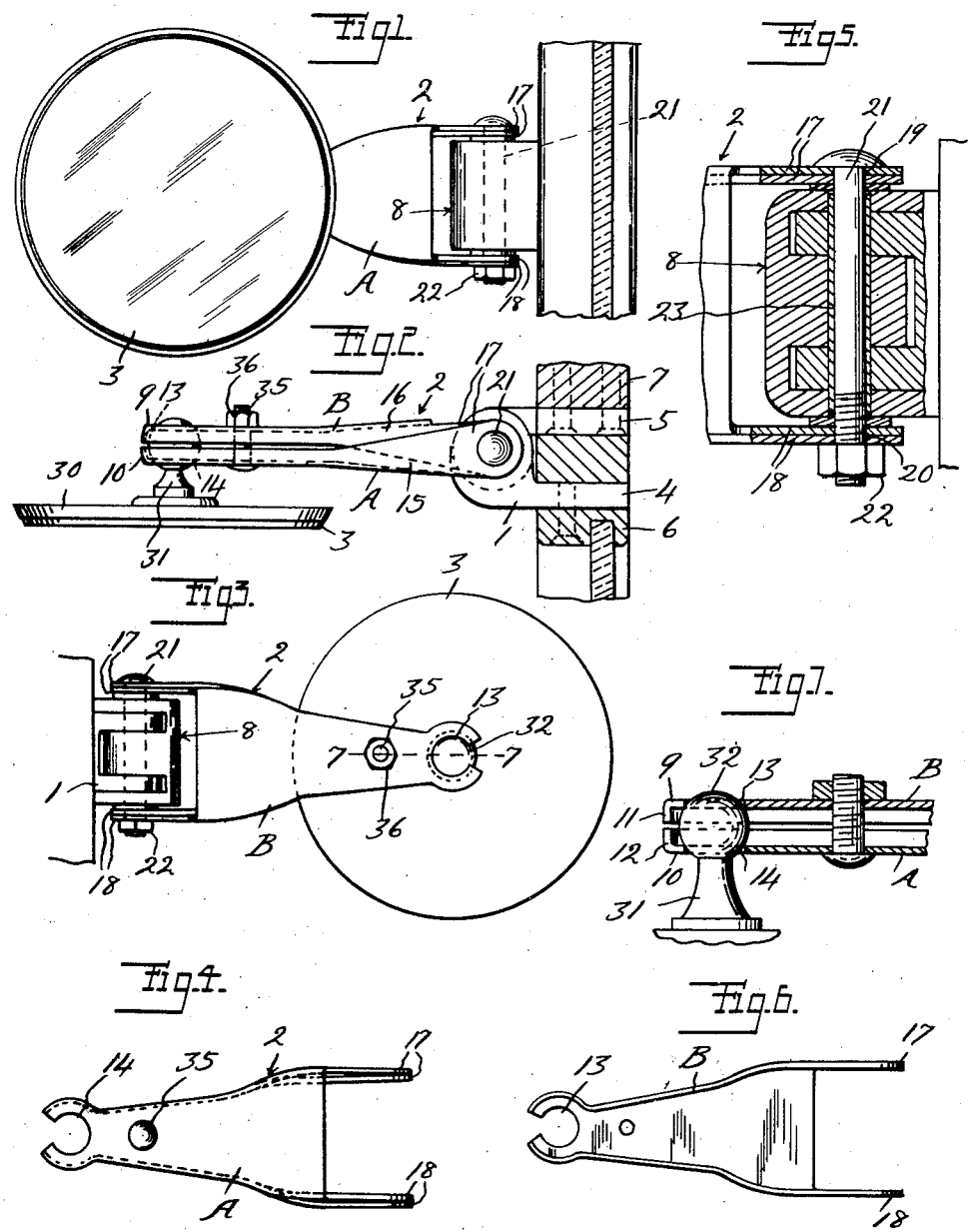
INVENTOR
Fred W. Zink
BY
Whittemore Hulbert Whittemore & Belknap
ATTORNEYS Patented Oct. 18, 1932

1,883,287

UNITED STATES PATENT OFFICE

FRED W. ZINK, OF DETROIT, MICHIGAN, ASSIGNOR TO KALES STAMPING COMPANY, OF DETROIT, MICHIGAN, A CORPORATION OF MICHIGAN

REAR VIEW MIRROR ASSEMBLY

Application filed November 11, 1929. Serial No. 406,411.

This invention relates generally to rear view mirror assemblies, particularly to those designed for use in connection with vehicle door hinges and the like, and consists of certain novel features of construction, combinations and arrangements of parts that will be hereinafter more fully described and particularly pointed out in the appended claims.

In the accompanying drawing:

Figure 1 is an elevation of a mirror assembly embodying my invention;

Figure 2 is a top plan view thereof;

Figure 3 is a rear elevation thereof;

Figure 4 is a detail view of the mirror supporting bracket;

Figure 5 is a cross sectional view through the bracket;

Figure 6 is a detail view of one section of the bracket;

Figure 7 is a section on the line 7—7 of Figure 3.

Referring now to the drawing, 1 is a vehicle body door hinge, 2 is an elongated bracket projecting laterally from the hinge, and 3 is a rear view mirror adjustably mounted on the outer end of the bracket. As shown, the hinge 1 is of conventional form and has the usual leaves 4 and 5 respectively secured to the door 6 and supporting pillar 7 of the vehicle body and has the intermediate connecting pin or pintle 8. Preferably the bracket 2 is formed of sheet metal and comprises complimentary channel shaped stampings A and B respectively. The bases 9 and 10 respectively of these stampings have aligned relatively short longitudinally extending slots 11 and 12 therein at one end thereof and are provided at the inner ends of these slots with aligned circular openings 13 and 14 respectively, while the sides 15 and 16 respectively of each stamping are provided at the inner ends thereof with substantially parallel flat extensions 17 and 18 having aligned circular openings 19 and 20 therein that receive the pintle 8 of the hinge, preferably above and below the hinge leaves 4 and 5, when the parts are assembled. With this construction a bolt 21 and nut 22 are used intermediate the ends of the stampings A and B to hold the parts together, and a sleeve such as 23 of suitable design is preferably used on the pintle between the extensions 17 and 18. If desired the extensions 17 and 18 of each stamping may be initially bent toward or from each other so that they will bind upon the hinge pin 8 when mounted thereon. Moreover, the extensions may be bent toward or away from each other to compensate for hinge pins of various lengths. Thus, to this extent brackets such as 2 are capable of universal mounting.

In the present instance the back plate 30 of the mirror is provided centrally thereof with a laterally projecting arm or stud 31 having a ball 32 at its free end, the ball being normally held in the aligned circular openings 13 and 14 in the stampings A and B by means of the clamping action of a bolt 35 and nut 36, as best shown in Figs. 2 and 7.

Thus with this construction the ball 32 of the mirror arm is capable of universal movement relative to the bracket 2 and the latter is capable of swinging in the arc of a circle upon and about the hinge pintle.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim as my invention is:

1. A mirror mounting including a bracket comprising two complementary channel-shaped members connected together for clamping engagement with a portion of a mirror and having aligned openings in the bases of the channels for receiving a clamping element, the sides of the channels having flat extensions beyond the bases aforesaid and provided with aligned openings for receiving a hinge pintle.

2. A mirror mounting including a hinge bracket comprising two channel-shaped members connected together and having portions for clamping a portion of a mirror, the side walls of the channel members being provided beyond the bases thereof with substantially flat extensions having aligned openings therein for receiving a hinge pintle, and a tubular sleeve for the hinge pintle extending between and having opposite ends thereof in alignment with the aligned openings in the extensions aforesaid, the length of said sleeve being substantially equal to the distance between opposed extensions whereby said sleeve substantially constitutes a tubular connection between said opposed extensions.

3. A mirror mounting including a bracket comprising two channel-shaped members connected together and having the bases of the channels substantially parallel to each other and having the side walls of one channel overlapping the side walls of the other channel, and said overlapping side walls being provided beyond the substantially parallel bases with substantially parallel overlapping flat extensions having aligned openings therein for receiving a hinge pintle.

4. A mirror mounting including two clamping members connected together and having substantially parallel clamping portions provided at one end thereof with substantially flat portions that project beyond the ends of said clamping members, said flat portions being in planes at substantially right angles to the parallel planes of said members, and the extensions of one member overlapping the extensions of the other member, and the extensions of both members having aligned openings therein for receiving a hinge pintle and the like.

5. A mirror mounting including a vehicle door hinge bracket comprising two pressed metal members having door hinge engaging portions and mirror supporting portions, the door hinge engaging portions being spaced apart a sufficient distance in substantially parallel relation to receive therebetween the door hinge sections and having openings in alignment with openings in said sections for receiving the door hinge pintle therein, and said mirror supporting portions being rigid with and extending at substantially right angles to said door hinge engaging portions, said mirror supporting portions being arranged one beside the other and connected together intermediate their ends, at least one of said mirror supporting portions being provided with an opening for receiving a part associated with the back of a mirror.

6. A mirror mounting including two elongated substantially parallel and flat metal members connected intermediate their ends, provided beyond the point of connection and one end thereof with aligned openings for receiving a part associated with the back of a mirror, and provided at the other end thereof with flanges that project laterally from opposite edges thereof and have end extensions that project beyond the members in substantially parallel relation and are provided with aligned openings for receiving a vehicle door hinge pintle.

In testimony whereof I affix my signature.

FRED W. ZINK.